United States Patent

Greim, deceased et al.

[15] 3,684,323
[45] Aug. 15, 1972

[54] DEVICE FOR DETACHABLY CONNECTING WOODEN SLATS TO JUNCTION ELEMENT

[72] Inventors: Walter Greim, deceased, late of Hildesheim, Germany; by Gunter Greim-Kuczewski, heir, Galgenfeldstrasse 47, 463 Bochum-Stiepel, Germany; Heinz Brunotte, deceased, late of Hildesheim, Germany; by Helene Brunotte nee von Kap-Herr, heir, Grosse Venedig 8, 3200 Hildesheim, Germany

[22] Filed: April 23, 1971

[21] Appl. No.: 136,684

[30] Foreign Application Priority Data

April 25, 1970  Germany..........P 20 20 242.0

[52] U.S. Cl..................287/20.92 F, 29/432, 287/97
[51] Int. Cl................................................F16b 7/00
[58] Field of Search ..287/20.92 R, 20.92 C, 20.92 F, 287/20.92 L, 61, 62, 63, 64, 65, 80, 82, 128; 254/188, 189, 192, 195; 52/146

[56] References Cited

UNITED STATES PATENTS

| | | | |
|---|---|---|---|
| 3,421 | 1/1844 | Waterman et al. | .........254/192 |
| 78,663 | 6/1868 | Harcourt | ....................254/192 |
| 1,158,895 | 11/1915 | Clark | ............287/20.92 C UX |
| 1,243,225 | 10/1917 | Roe | ........................287/62 UX |
| 2,629,906 | 3/1953 | Holmes | ...............287/20.92 C |
| 3,178,780 | 4/1965 | Booher | ...............287/20.92 C |

FOREIGN PATENTS OR APPLICATIONS

| | | | |
|---|---|---|---|
| 730,259 | 1/1943 | Germany | .............287/20.92 L |
| 566,424 | 9/1957 | Italy | .....................287/20.92 C |
| 257,965 | 11/1949 | Switzerland | .........287/20.92 L |

*Primary Examiner*—David J. Williamowsky
*Assistant Examiner*—Wayne L. Shedd
*Attorney*—John J. McGlew, Alfred E. Page and McGlew & Tuttle

[57] ABSTRACT

An improved device for detachably connecting wooden slats to junctions elements with at least one anchoring member comprising a threaded element, the threaded part of which extends substantially coaxially to the wooden slat and in extension thereof. The same device may be used for any cross-section and cross-sectional configuration of the wooden slat and secures the connection against accidental slackening and against torsional stresses. In particular, the invention relates to the end-face connection of wooden slats to junction elements.

10 Claims, 6 Drawing Figures

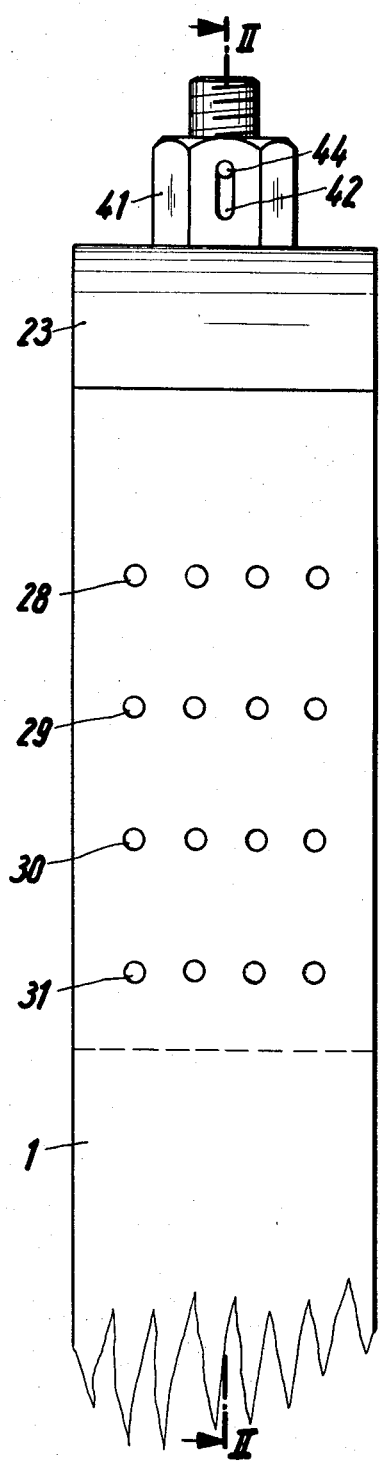
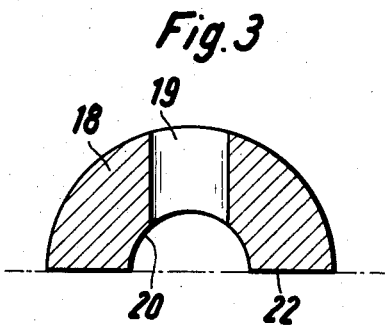
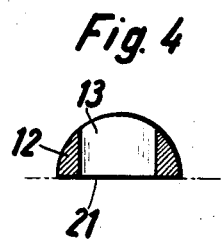

3,684,323

DEVICE FOR DETACHABLY CONNECTING WOODEN SLATS TO JUNCTION ELEMENT

BACKGROUND OF THE INVENTION

Slat junctions for wooden lattice structures, using junction plates fitted into slots of the slats to be connected and fixed by means of dowels or nails are already known in the art. In this construction, the junction plates extend into both wooden components to be joined, which are constructed as carrier beams. Connection by nailing offers here special advantages, because the junction plates, made more particularly of sheet metal, form bulges under the action of the nails being driven in and press into the adjacent wooden part, thereby producing a particularly firm connection.

However, special problems arise in the case of end-face connections to which the present invention relates. Such connections are of special importance for the construction of junction points for latticework structures. Here, the junction elements have radial bores into which anchoring parts on the wooden slats are fitted or screwed. The mounting of the anchoring part in the end face of the junction element presents a special problem.

It is known, with this object in view, to mount a threaded pin on a sleeve, which may be longitudinally divided or axially subdivided, and to fix this sleeve on the outside of the wooden slat. In one known construction (German Pat. No. 896,712), the fixing is effected in that an external socket is fixed circumferentially by using a putty, and a threaded pin, serving as anchoring element is longitudinally displaceably received in a conical member. This arrangement has the disadvantage that the anchoring element is located laterally only in a comparatively short bore. In addition, the connection by means of a putty is not very secure. In the case of wooden slats it is known to provide an external connecting element with steel dogs, having internal claw-like projections and holes. These dogs are placed from the outside over the wooden slat and bolts are fitted through the holes.

It is also known (Eastern German Pat. No. 5195) to fit slides over longitudinally divided bushes of wedge-shaped configuration and to tighten them in order to locate the anchoring element, which is fixed in the locking position by means of pins being driven in. In this construction, the sleeve part may have special profiles.

This construction is rather problematical in the case of wooden slats. The external arrangement cannot withstand slackening under alternating stresses because deflection towards the outside is possible. Apart from that, the axial guiding action for the anchoring element is not ensured.

Furthermore, the fixing on the outside is obviously limited to what must be regarded as a single layer construction, because obviously always one sleeve section only can be provided at any point.

Further disadvantages arise particularly in the case of wooden slats with round cross-section, because no particular resistance is provided against torsional stresses.

A further disadvantage of the known construction resides in the fact that for externally embracing the ends of the wooden slat, the fixing device must always be adapted to the cross-section of the wooden elements to be connected. Appropriate, i.e. different parts must be kept in store for every size and this results in an uneconomical construction.

SUMMARY OF THE INVENTION

It is the object of the invention to provide a device for detachably connecting wooden slats, in which the same parts may be used for any slat cross-section and any cross-sectional configuration, which may be simply multiplied in order to increase the mounting strength, and which ensures a torsion-proof arrangement with automatic security against slackening of the junction also in the case of torsional stresses.

According to the invention, this object may be realized in that the wooden slat has on its end face at least two parallel, axially directed slots into which are fitted the ends of at least one sheet metal strip, fixed by nailing from the outside as well known in the art, and in that the anchoring element has a head which is associated with an abutment, having a semi-cylindrical configuration on the side remote from the wooden slat, and over which the said at least one sheet metal strip is pulled. Where at least one sheet metal strip is mentioned, this should be taken to include that one or several sheet metal strips may extend over the abutment on both sides adjacent to the shank of the anchoring element. Where a single sheet metal strip is used it is provided with a center opening through which passes the shank of an anchoring member.

The invention provides a fixing of the sheet metal strip inside the wooden slat. Preferably, the nails driven in from the outside are so long that the sections formed by the slots are held together whilst simultaneously locating the sheet metal strip. Apart from the very strong, high tensile anchoring, this solution produces a high anti-torsion resistance. The anchoring elements, that is to say the ends of the sheet metal strip, cannot escape outwardly under the action of tensile stresses on the anchoring member, and are fixed on both sides. This mounting substantially improves the anchoring, especially since the fixing parts, i.e. the nails, are stressed only in shear and not in tension, as in the case where anchoring strips are provided on the outside with abutments. Furthermore, this construction results in an improved anti-torsion anchoring because the semi-cylindrical configuration presents a high resistance against torsion.

In a preferred embodiment of the invention, the abutment element is constructed integrally with the head of the anchoring element. In this case, one or more sheet metal strips may extend over the abutment element which ensures at the same time the alignment of the anchoring element with the direction of the axis of the wooden slat.

This construction includes that several anchoring elements are mounted side-by-side in the manner above described, or that one anchoring element has several threaded parts, i.e. threaded shanks, side-by-side. This is to be regarded as an essential feature of the invention.

According to a further embodiment of the invention, the abutment part is a semi-cylindrical element with a center bore through which the anchoring member may so extend that the threaded part protrudes from the abutment portion. Obviously, this always includes also a multiple construction in which the apex of the semicircular element is provided with a row of center bores in side-by-side arrangement, through which pass shanks of the anchoring element.

Preferably, the end face of the wooden slat has a center recess adapted to receive the head of an anchoring element constructed in the form of a screw bolt and projecting with its shank through the bore of the abutment member, wherein the end of the screw bolt forms the threaded part. This provides a special anchorage, particularly in the axial direction because an abutment for the anchoring member is formed in the head of the wooden slat.

According to the invention, the abutment member is semi-cylindrical internally and externally, and a semicylinder with a center bore is provided, fitting into the inner profile of the abutment element; this part is arranged inside the abutment element above the head of the anchoring member, and the end face of the wooden slat has four parallel slots of which the outer mount the first sheet metal strip embracing the abutment element, and the inner a second sheet metal strip embracing the semi-cylinder, wherein both sheet metal strips have center openings for the passage of the anchoring member. This arrangement substantially improves the mounting.

This construction also includes several semi-cylindrical abutment elements, and a semi-cylinder in internested arrangement, resting with their bases on the end face of the wooden slat and having each a center bore for the anchoring element, comprising a corresponding number of parallel slots in the end face of the wooden slat receiving the ends of sheet metal strips which pass over one of the abutment elements or over the semicylinder and through the centers of which passes the anchoring element. Thus, the invention makes it possible to use a plurality of fixing means, irrespective of the cross-sectional configuration of the wooden slat. The nailing provided according to the invention has the additional advantage that all fixing means, that is to say all ends of sheet metal strips, are fixed by the same nails which are also provided in the case of only one or two sheet metal strips.

The construction includes that the threaded member has a section which transmits the semi-cylindrical shape of the abutment element into a horizontal abutment surface, extending perpendicularly to the longitudinal axis of the anchoring element and adapted to be fitted over the threaded member. However, in the preferred embodiment of the invention, a socket is non-rotationally arranged on the threaded member, more particularly below the threaded section thereof, wherein the head is round and the socket forms an axial abutment for a junction point element or a counter element.

Where the recess is deeper than the height of the head, the socket is preferably axially displaceable on the threaded member by a corresponding amount, and the axial displacement is correspondingly limited, thereby enabling an axial abutment to be formed.

In a further preferred embodiment, the recess is not round and the head has a corresponding complementary profile and is arranged in the recess so that it cannot rotate. This provides an additional protection against rotation.

In principle, and in accordance with the preceding description, the head itself may have semi-cylindrical construction facing the abutment, and may engage therein.

BRIEF DESCRIPTION OF THE DRAWINGS

The invention will be further described, by way of example, with reference to the embodiments shown in the accompanying drawings in which:

FIG. 1 is a side elevation of the object of the invention;

FIG. 3 is a detailed view of an abutment element in side elevation and in cross-section corresponding to FIG. 2;

FIG. 4 is a side elevation of a cylindrical element in cross-section corresponding to FIG. 2;

In the different drawings, identical parts are marked with the same reference numerals.

DESCRIPTION OF THE PREFERRED EMBODIMENT

Figure 2:
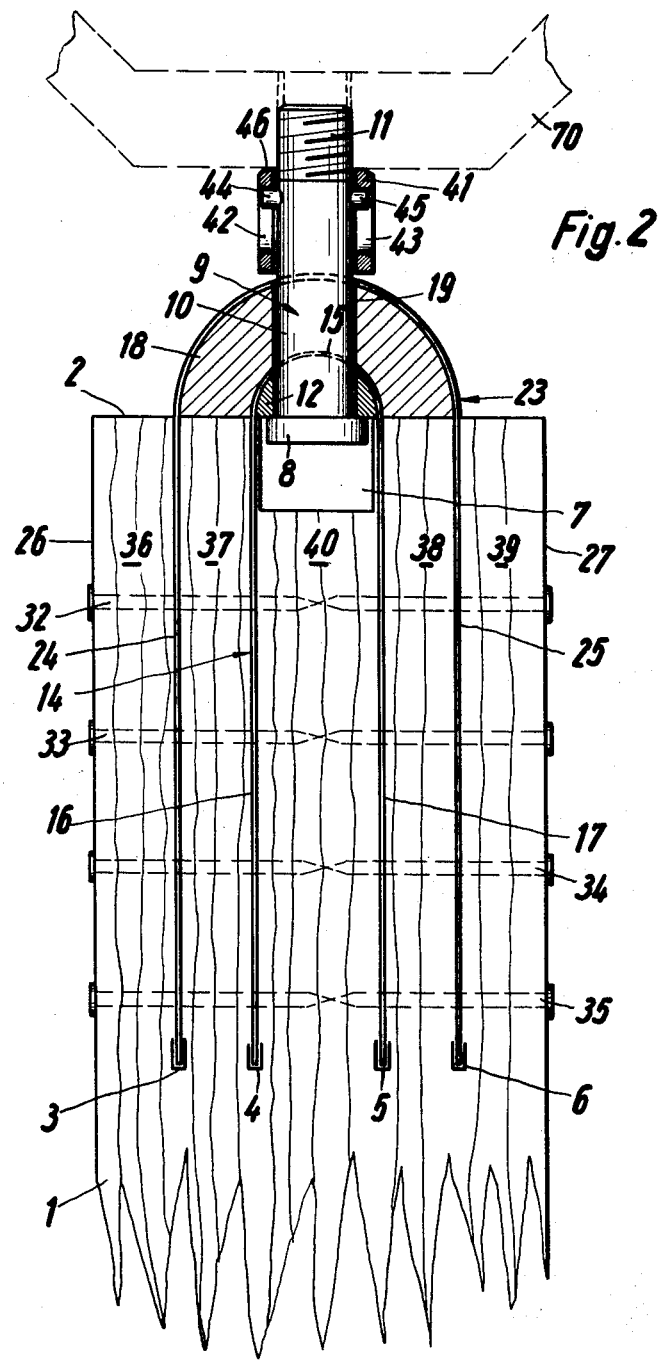
FIG. 2 is a cross-section along the line II—II in FIG. 1.

The construction shown in FIGS. 1 and 2, using the means illustrated in FIGS. 3 and 4, is based on a wooden slat 1 with rectangular cross-section. Four parallel slots 3, 4, 5, 6 are cut into the end face 2 of the slat, extending parallel to its axis. The slots are arranged symmetrically relative to a center plane. It is quite irrelevant whether the cross-section of the wooden slat is rectangular or round.

A recess 7 is provided in the center of the end face 2. This recess may be round for example. In the embodiment shown, a head 8 of an anchoring element 9 is arranged in the recess. The anchoring element has a shank 10 with a threaded element 11, both for example constructed as bolts. On the head 8 there is a cylindrical element 12 (FIG. 4), i.e. a semi-cylinder with a center bore 13 through which protrudes the shank 10 of the anchoring element 9.

Since the semi-cylindrical element 12 extends in a direction perpendicular to the plane of the drawing over he cross-section of the shank 10, a sheet metal strip may pass over both ends of the semi-cylinder or a single sheet metal strip 14 may be provided, having a center bore 15, through which passes the shank 10. The ends 16, 17 of the sheet metal strip are located in the slots 4 and 5.

In addition, an abutment element 18 is provided having a semi-cylindrical shape on the inside and outside, and a center bore 19 (FIG. 3). The profile of the inner recess 20 of the abutment element 18 is such that the semi-cylinder 12 with the sheet metal strip 14 can enter thereinto, so that the base surfaces 21, 22 of the semi-cylinder 12 and of the abutment element 18 are in one and the same plane, that is to say both these surfaces are seated on the end face 2 of the wooden slat 1. A further sheet metal strip 23 is fitted about the outside of the abutment element 18 and its ends 24 and 25 are mounted in the slots 3 and 6. Since both the abutment element 18 and the semi-cylindrical element 12 are prefabricated parts, the dimensions of which do not depend on the outer diameter of the wooden slat 1, the slots 3 through 6 are cut in a predetermined arrangement, so that the same sawing or cutting devices may be used for widely varying cross-sections of wooden slats and slot arrangements.

Rows 28, 29, 30, 31 of nails 32, 33, 34, 35 are driven into the wooden slat from the outsides 26, 27 extending parallel to the plane of the ends of the sheet metal strips; the nails pass through at least two metal strip ends and fix simultaneously wooden slat sections 36, 37, 38, 39, relative to each other and relative to the center section 40, pulling them together. Since the ends 16, 17, 24, 25 of the sheet metal strips are smooth they exhibit no tendency to escape towards the outside when affected by a tensile stress by the anchoring element 9. The nails are stressed only under shear. Even a torsional stress of the anchoring element 9 produces no result because the torsional stress is not transmitted to the sheet metal strips 14, 23 in which the anchoring element 9 could rotate.

According to one embodiment of the invention, the recess 7 may have a configuration other than round and the head 8 may be constructed correspondingly. For example, both parts may be square whilst the shank 10 and the bores 13, 19 are round. In this case, a rotational abutment is produced by the engagement of the head 8 in the recess 7. In view of the oblong construction of the semi-cylinder 12 and the abutment element 18, in the direction perpendicular to the plane of the drawing of FIG. 2, also the bores 13 and 19 may have a configuration other than round and the shank 10 may be constructed correspondingly, for example as a polygon. The transverse dimension of the sheet metal strips 14, 23 and their entering in parallel slots provides additional torsional safety. This presents a particular favorable feature of the invention.

Since in FIG. 2 the head 8 is flatter than the recess 7, a non-rotational socket 41 is mounted longitudinally displaceably on the shank in the zone of the threaded portion 11. As shown in FIG. 1, this socket may be an external hexagon and is provided particularly where a round head 8 is mounted in a round recess 7. In view of the greater depth of the recess 7 than would correspond to the height of the head 8, the longitudinal movement of the socket is provided by suitably dimensioned lateral axial slots 42, 43 into which engage transverse pins 44, 45 provided on the shank 10 and the threaded portion 11, respectively. If the anchoring element 9 would not be longitudinally displaceable, i.e. the recess 7 had the same depth as the height of the head 8, the longitudinal slots 42, 43 could be omitted. The axial positioning of the socket 41 is important to provide the end face 46 with a support for an element 70 to be mounted by screwing, such as a junction point element, as shown in FIG. 2.

The nailings 28 through 31, 32 through 35 are shown in the drawing in regular arrangement. However, this need not necessarily be so and the nails may extend for example from one outer surface 26 to near the other outer surface 27 or vice versa in order to provide a particularly good connection for all sections.

Figure 5:
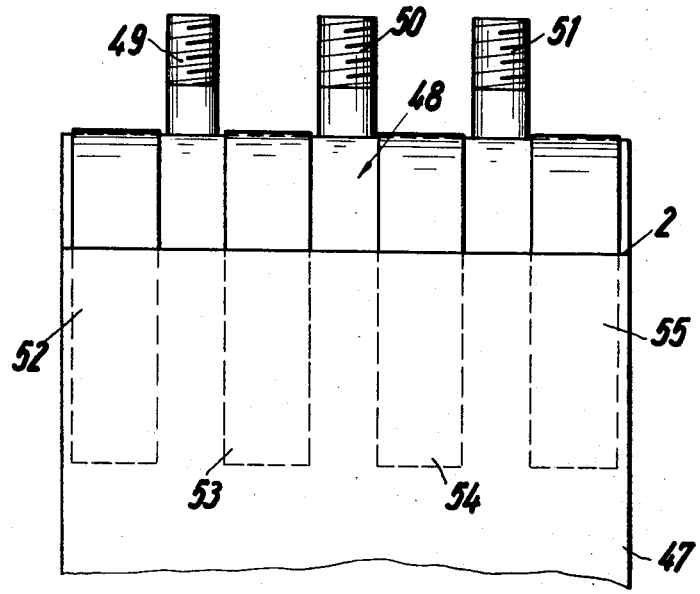
FIG. 5 is a diagrammatical side elevation of a multiple arrangement of threaded members on an anchoring element.

FIG. 5 shows a special solution corresponding to the arrangement of FIG. 1. The wooden slat 47 has corresponding cuts as in FIGS. 1 and 2. An abutment element 48, extending over the end face 2 and forming a part of the anchoring element, has three threaded members 49, 50, 51. Between these and outside the outer elements, sheet metal strips 52, 53, 54, 55 are positioned over the abutment element 48, as hereinbefore described, and anchored in the longitudinal slots. The nailing is not shown in the drawing. It may be seen that this includes a multiplication of the connecting facilities.

Figure 6:
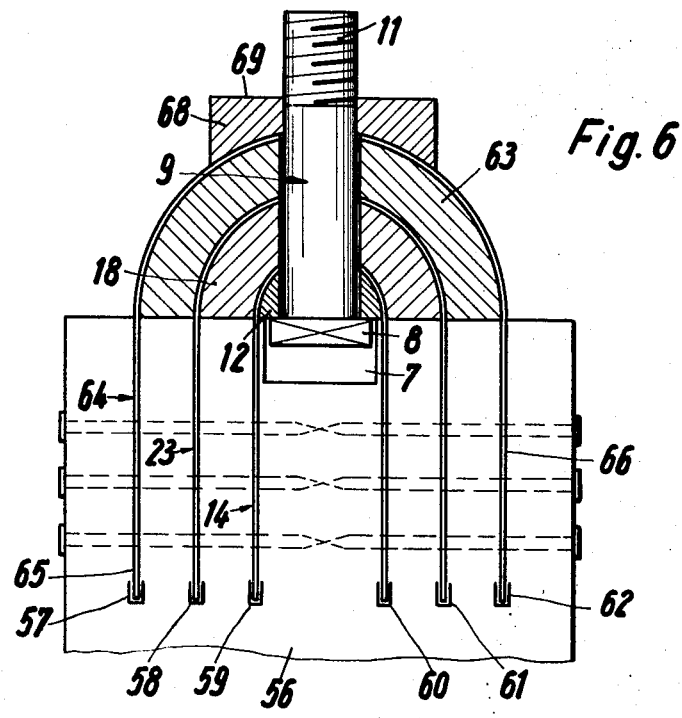
FIG. 6 is a cross-section corresponding to FIG. 2 and explanatory of a modified embodiment.

Compared with FIG. 2, FIG. 6 shows a wooden slat 56 with six parallel slots 57, 58, 59, 60, 61, 62. The head 8 of an anchoring element 9 fitted into a center recess 7 rests first on a cylinder section 12 on which is mounted an abutment element 18. The sheet metal strip or strips passing over the cylinder section 12 are shown at 14, and the sheet metal strip passing over the abutment element 18 at 23. According to FIG. 6, there is provided a further abutment element 63 of semi-cylindrical configuration and embraced by a sheet metal strip 64, the ends 65, 66 of which are guided in slots 57, 62 and fixed by nailing as in FIG. 2. This provides the possibility of a multiplication of the mounting.

In FIG. 6 the outer fixing strip 67 carries a saddle-shaped element 68 which provides a mounting surface 69 perpendicular to the axial direction of the anchoring element.

We claim:

1. A device for detachably connecting wooden slats to junction elements, comprising a wooden slat (1, 47, 56) with at least two parallel slots (3–6, 57–62) cut into one end face (2) of the wooden slat in the axial direction, an anchoring element (9) having a shank with a thread and located in the axial extension of the wooden slat on the said end face thereof, at least one abutment element (12, 18, 48, 63) for the anchoring element, wherein the said abutment element has a semi-cylindrical configuration on the side remote from the wooden slat and rests with a flat surface on the said end face, and at least one sheet metal strip (14, 23, 67) passing over the semi-cylindrical side of the abutment element (12, 18, 48, 63) and fitted with its ends into the said slots, and fixed therein by nails driven from the outsides into the wooden slat.

2. A device as set forth in claim 1, comprising a first abutment element (12) with semi-cylindrical cross-section and at least one bore for a threaded shank of an anchoring element, and a second abutment element (18) in the form of a semi-cylindrical element with at least one bore for the passage of the threaded shank of the anchoring element, wherein the said second abutment element has, on its side facing the wooden slat, a semi-circular recess adapted to receive the said first abutment element, comprising four parallel slots in the end face of the wooden slat, and at least one first sheet metal strip is positioned over the first abutment element and each end thereof is fitted into one of the adjacent inner slots, and at least one second sheet metal strip (23) is positioned over the second abutment element and its ends are fitted into the two outer slots, wherein the ends of the sheet metal strips are fixed in their respective slots by nails driven into the wooden slat from the outside.

3. A device as set forth in claim 1, wherein the anchoring element has on its end facing the wooden slat a head (8) having a width greater than the threaded shank and the wooden slat has a center recess (7) in the said end face, wherein the said head (8) of the anchoring element (9) is arranged in this recess, the abutment element (12, 18) has a bore through which passes the threaded portion of the anchoring element (9) in the extension of the axis of the wooden slat, and carrying a screw thread on its section projecting beyond the abutment element (12, 18).

4. A device as set forth in claim 2, in which the second abutment element has semi-cylindrical configuration on the inside and on the outside, and the sheet metal strips have orifices through which passes the shank of the anchoring element.

5. A device as set forth in claim 2, in which a shaft of an anchoring element (49–51) is made integrally with the said first abutment element (48).

6. A device as set forth in claim 3, in which a socket is provided under the threaded portion (11) of the anchoring element, projections (44, 45) are arranged in the direction of the circumference on the anchoring element and extend into recesses on the said socket, wherein these recesses extend in the axial direction of the socket to make possible a displacement thereof on the threaded section, and wherein the recess (7) is higher than the height of the head.

7. A device as set forth in claim 3, wherein the recess (7) has a cross-section other than round, and the head piece (8) has a profile of complementary non-round configuration and is located non-rotatably in the said recess (7).

8. A device as set forth in claim 1, comprising a saddle element (68) with a semi-circular recessed section which overlies an outer sheet metal strip (64) which extends over an outer abutment element (63), wherein the said saddle element is provided with at least one orifice for the threaded shank of the anchoring element (9) and forms on the side remote from the wooden slat a plane (69) extending perpendicularly to the axis of the said shank.

9. A device for mounting at least one anchoring element equipped with a threaded pin on the end face of a wooden slat in the axial extension thereof, comprising a first semi-cylindrical abutment element (12) and several second abutment elements (18, 63) fitted on to each other having semi-cylindrical configuration on the outside and a semi-cylindrical configuration on the inside of such size that they can receive therein an abutment element located thereunder with at least one intermediate sheet metal strip, wherein the abutment elements have orifices adapted to receive at least one threaded pin and the end face of the wooden slat has a number of parallel slots which is twice the number of the abutment elements, and which are spaced apart from the inside towards the outside by an amount corresponding to the width of the base of an abutment element, wherein further at least one sheet metal strip is mounted to embrace each abutment element and its ends are fixed in the associated pair of slots, wherein the inner sheet metal strips (14, 23) are located between adjacent abutment elements and all ends of sheet metal strips fitted in the said slots are fixed by means of nails driven from the outside into the wooden slat.

10. A device as set forth in claim 9, wherein the abutment elements on the end face, parallel to the slots and in the axial direction of the semi-cylindrical cross-sections are of oblong configuration, the abutment elements are provided with several orifices arranged side-by-side in the axial direction, and several anchoring elements (49 to 51) extend through these orifices and several sheet metal strips are mounted on each abutment element between and adjacent to the anchoring elements.

* * * * *